US007114842B2

(12) United States Patent
Nakamura

(10) Patent No.: US 7,114,842 B2
(45) Date of Patent: Oct. 3, 2006

(54) CONTROLLING READY MIXED CONCRETE SLUDGE WATER

(75) Inventor: Seiji Nakamura, Machid (JP)

(73) Assignee: W.R. Grace & Co.-Conn., Columbia, MD (US)

( * ) Notice: Subject to any disclaimer, the term of this patent is extended or adjusted under 35 U.S.C. 154(b) by 616 days.

(21) Appl. No.: 10/312,906

(22) PCT Filed: Jul. 5, 2001

(86) PCT No.: PCT/US01/21352

§ 371 (c)(1), (2), (4) Date: Jan. 2, 2003

(87) PCT Pub. No.: WO02/06024

PCT Pub. Date: Jan. 24, 2002

(65) Prior Publication Data

US 2004/0128032 A1    Jul. 1, 2004

(30) Foreign Application Priority Data

Jul. 5, 2000    (JP)    ............................. 2000-203445

(51) Int. Cl.
*G28B 11/00*    (2006.01)
*E01C 19/10*    (2006.01)
(52) U.S. Cl. ........................................... 366/3; 366/17
(58) Field of Classification Search ................ 700/265, 700/1, 9; 366/1, 2, 6, 8, 16, 17, 3
See application file for complete search history.

(56) References Cited

U.S. PATENT DOCUMENTS

| | | | | |
|---|---|---|---|---|
| 3,186,596 A * | 6/1965 | Badgett | ........................ | 222/14 |
| 3,997,434 A * | 12/1976 | Macauley, Jr. | ................ | 209/10 |
| 4,298,688 A * | 11/1981 | Kallies | .......................... | 435/14 |
| 4,318,177 A * | 3/1982 | Rapp et al. | ................... | 700/265 |
| 4,615,215 A * | 10/1986 | Sugimoto et al. | .............. | 73/866 |
| 5,452,213 A * | 9/1995 | Ito et al. | ...................... | 700/117 |
| 5,590,976 A * | 1/1997 | Kilheffer et al. | ............... | 404/72 |
| 5,647,986 A * | 7/1997 | Nawathe et al. | ............. | 210/608 |
| 5,653,533 A * | 8/1997 | Green | ........................... | 366/19 |
| 5,695,280 A * | 12/1997 | Baker et al. | ................... | 366/17 |
| 5,725,655 A | 3/1998 | Catterton et al. | ............ | 106/738 |
| 5,766,524 A | 6/1998 | Rashwan et al. | .............. | 264/37 |
| 5,775,803 A * | 7/1998 | Montgomery et al. | .......... | 366/2 |
| 6,042,258 A | 3/2000 | Hines et al. | .................... | 366/8 |
| 6,042,259 A | 3/2000 | Hines et al. | .................... | 366/17 |
| 6,231,663 B1 | 5/2001 | Catterton et al. | ............ | 106/705 |
| 6,484,079 B1 * | 11/2002 | Buckelew et al. | ............. | 701/29 |
| 6,535,795 B1 * | 3/2003 | Schroeder et al. | ........... | 700/266 |
| 6,638,344 B1 * | 10/2003 | Horton et al. | ................. | 95/280 |
| 6,971,783 B1 * | 12/2005 | Owen | ............................ | 366/6 |

\* cited by examiner

*Primary Examiner*—Anthony Knight
*Assistant Examiner*—Michael B. Holmes
(74) *Attorney, Agent, or Firm*—Craig K. Leon

(57) ABSTRACT

Method and system for concrete wash-out water re-use, wherein an apparatus such as a mixing truck (1) is washed out and sludge (2) water re-used. The invention comprises providing sensors (11), in a communication system connected with a control center (10), for determining amount of retarder (4) used and resulting sludge water/concentration. The data is analyzed such that overdoses or insufficient doses of retarder are minimized or prevented. Warnings or corrective signals can then be sent by the control center (10) if needed.

13 Claims, 1 Drawing Sheet

CONTROLLING READY MIXED CONCRETE SLUDGE WATER

BACKGROUND OF THE INVENTION

The present invention relates to a method for controlling a concrete sludge water, such as the water used for producing a ready-mixed concrete or a precast concrete, by washing a mixing drum or other container apparatus in which the concrete was mixed or in which it is adhered, the washing involving a retarder-containing sludge water; removing aggregates from the wash sludge water; and reusing the sludge water thus obtained as part of a mixing water for a fresh batch of concrete, on the next day or after the next day, without discharging waste from the concrete plant. The invention permits detection of excessive or insufficient retarder amounts added to the sludge water, and allows operators to cope instantly with these circumstances.

As taught in the prior art, Japanese Patent Publication (Kokai) No. Hei 2-263100/1990 (Patent No. 265137), it is known to wash a mixing apparatus (in which the concrete adheres) with a retarder-containing water, separating aggregates from the wash water, storing the sludge water thus obtained in a manner so as to retain the activity of the concrete therein, and reusing the sludge water in mixing water for a fresh batch of concrete on or after the next day of operations. No less than 200 concrete plants currently employ this method and consequently ceased discharging deactivated concrete wastes. As the generation of concrete-polluted water has ceased, there has been environmental advantages and the conservation of resources.

Still, concrete plants involve many open-air operations, and the water content, aggregates, and other constituents of concrete can vary from day-to-day. Sand and gravel are natural materials used in concrete, and their compositions may vary. Although concrete is an industrial product, there are variations in the components due to variations in the practices and materials of each manufacturer, the equipment of the concrete plant, and other factors. Accordingly, the accurate control of concrete is difficult. Various types of concrete admixtures have been developed, and concrete is produced according to the specification of a construction company and transported by an agitator vehicle to the construction site by skilled technologists who are needed for sufficient product control.

In addition, the amount of a retarder to be added is not fixed and may vary greatly due to the changes in the seasons. For example, if the day after a mixing and pouring is a holiday, a retarder will be added in a large quantity. Also, the concentration of solids can also greatly affect the amount of retarder in the sludge water. Thus, maintaining control over the amount of retarder added into the concrete at the plant has been rather difficult.

Adding to these difficulties is the fact that dispensers, which supply retarder materials from tanks, are located in open air and sometimes broken down by the effects of wind and rain, and particularly by thunderstorms. Another factor to consider is that many plants are unattended at night. Of course, there is also the possibility of simple mistakes due to operator error, which necessitates double and triple checking. Thus, it is not surprising sometimes to find that retarders are sometimes dosed in amounts two to six times greater than actually required. Concretes prepared with sludge waters containing such large amounts of retarder do not advance operations at the construction site due to the variable and often extended retarding of setting, and this is the trouble that frequently arise where concrete plants are concerned.

Another problem is that if the retarder amount is deficient, the concrete will have lost some of its activity, and when mixed with fresh concrete it will be difficult to mix, and this can result in a concrete mix that is naturally deteriorated. In order to retain quality, the provider of the concrete sometimes disposes of the concrete, an action which is contrary to the purpose of using retarder technology in the first place.

Control over the accuracy in the dosing of retarders is an essential matter for concrete plant operations, but this is far from perfect because the number of highly qualified technologists stationed at concrete plants is sometimes not adequate.

SUMMARY OF THE INVENTION

An objective of the present invention is to avoid the problems of prior art practice in controlling retarder levels by providing sensors in a communication system to transmit a signal, corresponding to the amount of retarder in a retarder tank, after completing an operation wherein a retarder is mixed into a concrete (e.g., concrete for ready-mix or precast, for example), to a control center; and the signal which has detected the amount and the concentration of the sludge water in a sludge tank to the control center are provided to avoid problems caused by introducing excess retarder during washing operations involving mixing drums, containers, or other devices in which concrete has been mixed with a retarder-containing water, separating aggregates from the washed water and reusing the sludge water thus obtained as the part of a mixing water of fresh concrete on or after the next day of operation.

Thus, an objective is to provide a method of controlling a concrete sludge water, a method involving detecting whether an excess or deficiency of retarder is added to sludge water. This allows the operator to make an adjustment, thereby avoiding the need to have to discharge waste concrete and/or sludge water from the plant. The operator may wash the mixer or apparatus in which the concrete is adhered with a retarder-containing water, remove aggregates from the wash water, and reuse the sludge water as the part of a mixing water for fresh concrete on or after the next day of operation.

An exemplary method of the invention thus comprises washing an apparatus to which concrete has been adhered with a retarder-containing water, removing aggregates from the washed water and reusing the sludge water as the part of a mixing water of fresh concrete on or after the next day of operation, the invention being characterized by providing, in a communication system connected to a control center, a first sensor operative to transmit a signal to control center corresponding to the amount of retarder in a retarder tank after completion of operations (e.g., after washing out the mixing truck) and a second in the communication system connected to a control center, the second sensor operative to transmit a signal to the control center corresponding to the amount and/or concentration of sludge water in a sludge tank. The control center thereby permits dosage of retarder into the sludge tank to be adjusted more accurately, so as to avoid problems that can be caused by introducing excessive amounts of retarder.

Further advantages and benefits of the invention will be further comprehended in view of the following detailed descriptions that follow.

DETAILED DESCRIPTION OF EXEMPLARY EMBODIMENTS

Figure 1:
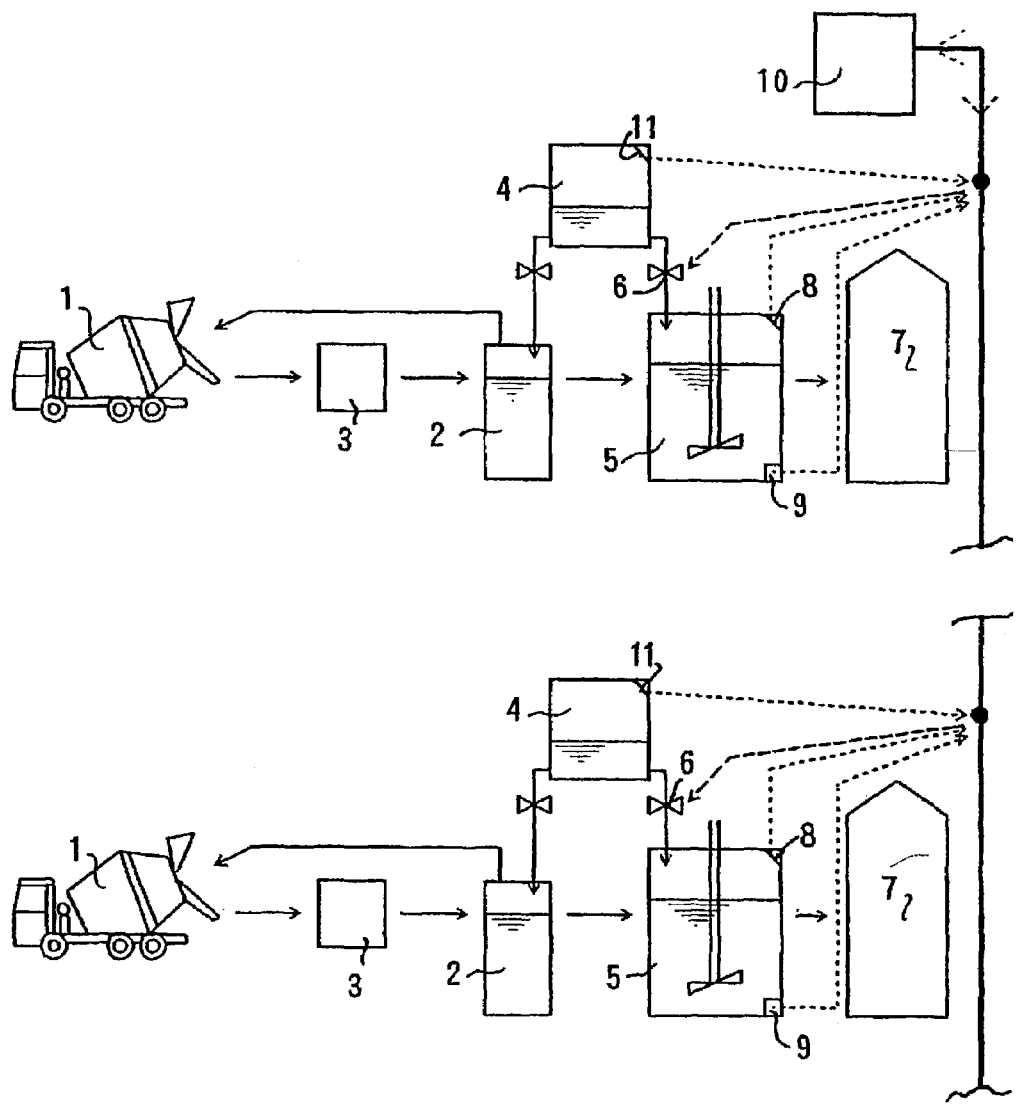
FIG. 1 is a schematic diagram of an exemplary method and system of the present invention, wherein an exemplary waste sludge water re-use system is connected to a control system, which in turn can be connected to one or more waste sludge water re-use systems.

In a concrete plant, after the last mixing truck or other concrete conveying vehicle has been washed out, it is now possible, by application of the method and system of the present invention, to avoid generating sludge water wastes at night.

FIG. 1 illustrates that two or more exemplary waste sludge water re-use systems (each system comprising the components designated generally as at 1–6, 8, 9, and 11) can be connected to a control system 10, that can be located on the same premises or at a different premises. Alternatively, the two sets of waste sludge water re-use systems can be located on the same or different premises from each other, and/or on the same or different premises from the control system 10. For example, the control system 10 can be connected to any number of different users (i.e., different waste sludge water re-use systems) by telephone or internet.

After the sludge water is used for washing out the last truck for a given day's operation, the entire sludge water 2 is stored in a sludge tank 5, as shown in FIG. 1, and slowly stirred in the presence of a necessary and sufficient amount of a retarder. On the basis of the concentration of concrete in the sludge water added with an exact amount of the retarder, the amount of the sludge water to be used in mixing fresh concrete on the next day together with the amounts of concrete and fresh water to be reduced in accordance therewith is calculated.

Accordingly, as shown for purposes of illustration at the upper corner of retarder tank 4, there is provided by the present invention a sensor 11, such as an ultrasonic level sensor, to transmit to a control center or system 10 a signal corresponding to the level of the retarder in tank 4. The tank level is detected after completion of operations. In the control center 10, an abnormally small or large amounts of added retarder may be sensed by statistical comparison from data accumulated by the control center 10, and this can result for example in a report to the concrete plant so that the abnormal retarder level can brought to the attention of personnel at the concrete plant, or, as another example, the dispenser 6 from the retarder tank 4 can be opened or closed depending on the circumstances.

Furthermore, when an ultrasonic level sensor, shown for illustrative purposes designated as 8 at the upper right corner of the is sludge water tank 5, is provided, and an ultrasonic concentration sensor 9 or the like is provided, as shown for illustrative purposes at the lower right corner of the sludge water tank 5, the amount and concentration of the sludge water can detected by these sensors. This information obtained thereby can also be transmitted to control center 10. From the amount and concentration of the sludge water in sludge water tank 5, the amount of concrete to be kept active can be calculated. The data collected may be used for determining whether relatively large or small amounts of retarder exist in the sludge water, and trouble can be avoided by having the control center report the abnormally large or small retarder amounts to the particular concrete plant, by having the control center open or close the dispenser to adjust the retarder dispenser accordingly, such as on a day to day basis. The data can also be used to adjust retarder additions when sludge water is subsequently used for making fresh concrete.

As a way to ensure accuracy in the amount of the retarder being dosed, it is preferable to employ a reducing sugar, such as glucose, and test paper that indicates by color changes, when the paper is dipped in the sludge water, the presence and relative amount of the reducing sugar present in the sludge water. Hence, an exemplary method of the invention comprises detecting the amount of the retarder in the sludge water by adding a reducing sugar to the retarder to visually determine the activity of the concrete in the sludge water by the color reaction with said reducing sugar. Further exemplary methods comprise detecting the amount of the retarder in the sludge water by moistening with the sludge water a test paper obtained by allowing a filter paper to adsorb a reagent to exhibit a visually recognizable color reaction with the reducing sugar and drying the moistened filter paper. The reducing sugar is preferably glucose, dextrose, or mixture thereof; and the reagent preferably comprises glucose oxides, peroxides, o-toluidine, or mixtures thereof.

An exemplary working mode of the invention is described as follows. The term "apparatus" as used herein and after refers to a mixing truck, tank, or other vessel to which concrete (e.g., ready-mix, precast) has been adhered and which requires a washing operation. Thus, the term apparatus may refer to the drum of an agitator vehicle (e.g., ready mix truck) or to mixing containers as are used at the concrete plant sites where fresh concrete is produced.

Further, the term "retarder" as used herein means and refers to all compounds having the effect of generally retarding the setting of concrete, including hydroxycarboxylic acid compounds such as gluconic acid, citric acid and tartaric acid; sugars such as glucose, sucrose and lactose; aminophosphoric acid compounds and their salts, e g., aminotrimethylene phosphonic acid; water reducing agents of ligninsulfonic acids and salts thereof which have no accelerating action; and silicofluorides. The term "sludge water" means and refers to a suspension of concrete or cement which still has activity (e.g., having some ability to harden or to harden further).

A working exemplary embodiment of method and system of the present invention can be explained with reference to FIG. 1 as follows.

An agitator vehicle 1 (e.g., a ready mix truck), which is but one example of an apparatus to which concrete is adhered, is washed with sludge water from a sludge tank 2 which holds the wash water on a temporary basis. Subsequently, from this wash water, aggregates such as sand and/or gravel are removed/recovered using in an aggregate separator 3, and the resulting sludge water is again recovered in temporary sludge tank 2. Thus, the sludge water may be repeatedly used. Herein, when a sufficient amount of a retarder from retarder tank 4 is added to the sludge water, which is also the wash water, the sludge water can be repeatedly used in washing operations while continuing to maintain the activity of the concrete gradually to increase the concrete concentration in the sludge water. When the sludge water reaches such a high concentration that causes an inconvenience in washing, the sludge water is transferred from the temporary tank 2 to sludge tank 5, further diluted with fresh water, and a retarder is added to permit further processing.

Thus, when the sludge water reaches or exceeds a predetermined concentration, it is stored in sludge tank 5 at a concentration of 20% or less (by weight). Because the sludge water is stored in the sludge tank 5 in a concentrated state for anywhere from one day to less than a week later, a slow stirring means is used to prevent settling of the concrete. Retarder is added into the sludge tank 5 from retarder tank 4 through a dispenser 6 in an appropriate amount. The control over the appropriate amount dispensed is described below.

When used in the production of fresh concrete, the sludge from sludge tank 5 should preferably not be added whereby the concrete contributing to the concrete feedstock exceeds 3% (wt.). A concrete plant which produces fresh concrete is designated at 7 in FIG. 1. Surplus sludge water that cannot be added to the concrete feedstock can be mixed with fresh concrete on the next day or a day thereafter. Subsequently, it will follow that on some days, the entire amount of sludge water can be used, and, on other days, only a portion of the sludge water can be used.

After the last agitator vehicle is washed out with wash water, the wash water is treated and transferred from temporary wash tank 2 and transferred to sludge tank 5. In sludge tank 5, the appropriate amount of retarder to be added to the concentrated sludge water, for purposes of storage, can be determined by those of ordinary skill and will depend on seasonal influences, temperature, storage time, condensation, and other factors.

According to the present invention, a sensor 8 for detecting the volume of the sludge water and a concentration sensor 9 for detecting concentration of the sludge water are provided in the sludge tank 5. Signals from these sensors are transmitted to a control center 10 to enable calculation of the appropriate amount of the retarder to be primarily added.

Furthermore, a sensor 11 for detecting the amount (e.g., volume) of the retarder is provided in the retarder tank 4, and a signal therefrom is transmitted to control center 10, such that the volume of retarder used and the volume of the retarder after completion of daily wash-out operations can be determined. In other words, the volume of the retarder used in one day together with the signal of the day before (and signals from prior days as well) can be detected.

At control center 10, the data is collected and can be treated on a statistical basis, because the total amount and the concentration of the sludge water discharged from each day's operations and the daily amount of the retarder used can be calculated. This capability enables review as to whether the amount of retarder added has been too great or too little. Furthermore, at control center 10 all the signals from the sensors can be detected.

When the amount of the retarder added is determined, after review of the data, to have been too much or too little, the control center can report this result to the particular plant and/or transmit a signal to carry out a further operation, such as to open or close the valve from the dispenser.

Sensor devices suitable for use in the present invention, such as sensors for detecting volume of fluids, are available. For example, there exist sensors that utilize reflection principles based on ultrasonic waves and the like. For detecting concentration levels, sensors are known based on ultrasonic operation, specific gravity methods, electrical detection based on variation of impedance, and the like. In addition, optical sensors are available for detecting concentration based on detection of light scattered by colloidal systems. In addition, the aforementioned communication system which may be used for rendering the sensors in communication with the control center 10 may be any system that can accomplish the above described objectives, including, for example, the NTT-DOPA network, a telephone network, the I-mode (portable telephone) internet, the intranet, and other known means.

Furthermore, the means for transmitting signals from each plant is not limited. Preferably, the transmission means permits transmission to be confirmed, and for the ability of the control center 10 to send warnings to each plant, if necessary or required, depending on the mode of the returned signals.

In addition, for safety's sake, it is preferred to add a reducing sugar having retarding properties, such as glucose, to the retarder to enable the amount of retarder to be determined. Thus, further exemplary methods of the invention comprising detecting the amount of retarder in the sludge water by adding a reducing sugar to the retarder to visually recognize the activity of the concrete in the sludge water by the color reaction with said reducing sugar.

The detecting reagent biochemically detects hydrogen peroxide to be formed by using an enzyme such as glucose oxidase and galactose oxidase in the enzymatic method or detects by a chemical method. Above all, glucose forms hydrogen peroxide by the action of glucose oxidase, and then oxidizes o-toluidine by the action of peroxidase to give a blue color from a yellow color depending on the concentration of glucose. This reaction is sensitive, detectable in a short period of time, and is specific to glucose.

In addition, there is the Bertrand method of adding a Fehling's solution to a sample liquid, and titrating $Cu_2O$ which precipitates depending on the amount of the reducing sugar with $H_2SO_4$ or a standard solution of acidic potassium permanganate, the Somogyi method of titrating $I_2$ which $Cu_2O$ having been produced by reducing $CuSO_4$ with a reducing sugar in alkalinity liberates with $KIO_3+KI$ with $Na_2SO_3$ or allowing the $I_2$ to give a color with a starch solution and the like.

The visual recognition in the present invention means a method by which one can judge with the naked eye without using a specific instrument. Thus, the color reaction by which the presence of a reducing sugar can surely be judged is preferred.

However, all reactions that are accompanied by a change which the naked eye can recognize, such as formation of turbidity, increase in transparency and change in the surface state are included.

A method which can judge the presence of a reducing sugar by a color reaction or another change by allowing a filter paper to previously adsorb a reagent, drying the resulting paper obtained paper, and dipping the paper thus prepared in the sludge water is preferred. Further, a method which comprises placing a sample water to be examined in a glass tube and adding a reagent to the water dropwise to judge some change is preferred.

Exemplary concrete sludge water re-use systems of the invention therefore comprise: a retarder dispenser 4 having a sensor 11 operative to generate a signal corresponding to the level of retarder in a retarder tank 4; and a sludge tank 5 having a sensor 8 operative to generate a signal corresponding to the level of sludge water in the sludge tank 5, the sludge tank further having a sensor 9 operative to generate a signal corresponding to the concentration of sludge in the sludge water contained in the sludge tank 9. The signals can be fed into a control center, or, as previously mentioned, into a communication system the renders the sensors communicative with a control center elsewhere on the premises or located on an entirely different premises. It is also within contemplation of the present invention that exemplary concrete sludge water re-use systems can involve numerous sets of tanks and sensors, located on different premises, operative to communicate with the same master center 10.

The following examples are provided for illustrative purposes and not intended to limit the scope of the invention.

EXAMPLE 1

A solution containing 20% of sodium gluconate and 15% of glucose was used as the retarder.

In a plant A, the amounts of the retarder used every day since the first day of an month were 21, 18, 23, 0, 17, 19 and 93 l, respectively. The day on which no retarder was added (0 l) was a holiday. Since 93 l was an abnormal amount, this fact was reported to plant A, and the next morning the retarder in sludge tank 5 was examined by dipping a test paper in the sludge water. The test paper was the one obtained by impregnating a filter paper with a mixed solution of 450 units of glucose oxidase, 14 units of peroxidase and 8.4 mg of o-toluidine and drying the resulting filter paper. The test paper turned fresh blue, and a danger of sending concrete with the use of this sludge water for fresh concrete as usual which would not set could be avoided.

EXAMPLE 2

The amount of the sludge water in sludge tank 5 in a plant A was detected by first sensor 8 and the sludge concentration was detected by concentration sensor 9. Furthermore, the amount of the retarder was detected by second sensor 11. The retarder used was the same as in Example 1. The amount of the retarder used, the concentration of the sludge water and the amount of the sludge water which were detected in 12 days were shown in Table 1.

TABLE 1

| | Day | | | | | | | | | | | |
|---|---|---|---|---|---|---|---|---|---|---|---|---|
| | Mon | Tue | Wed | Thu | Fri | Sat | Su | Mon | Tues | Wed | Thu | Fri |
| Retarder Used (l) | 17 | 20 | 41 | 18 | 15 | 20 | 0 | 16 | 21 | 22 | 25 | 14 |
| Amount Sludge Water (m$^3$) | 13 | 11 | 20 | 11 | 12 | 13 | 0 | 15 | 17 | 12 | 14 | 17 |
| Concentration Sludge Water (%) | 15 | 17 | 20 | 15 | 12 | 14 | | 10 | 12 | 16 | 17 | 20 |

In plant A, the amount of the retarder used per day is about 15 to 22 l. On Wednesday, the third day, the amount of the retarder used was a bit too much, but the concentration and the amount of the sludge water were both extremely high on this day. This predicts a large amount of returned fresh concrete (e.g., ready mix) and the remaining ready mixed concrete, and accordingly requires a large amount of the retarder, and thus the control center did not send out any warning.

However, on Friday, the last day in Table 1, in spite of the high concentration of the sludge water, the amount of the retarder used is rather small. When the sludge is left to stand as it is, concrete which will lose its activity would be incorporated into fresh concrete in the next morning. The quality of the products will naturally be reduced. Accordingly, the control center sent out a signal to open dispenser 6 and to close dispenser 6 at the point of time when about 15 l of the retarder were introduced and transmitted this instruction to plant A.

On the next morning, the test using the same test paper as in Example 1 was carried out and no color reaction was caused, and the activity of concrete could finally be retained.

Thus, in operations involving washing with a retarder-containing water, an apparatus such as a mixing drum, in or to which concrete has been adhered; removing aggregates from the washed water; and reusing the sludge water as part of a mixing water for a fresh batch of concrete on the next day after operations or after the next day of operations, the present invention provides numerous benefits: such as, avoiding discharging wastes from the concrete plant; minimizing over-dosing or under-dosing retarders into the sludge water; permitting the detection of retarder dosage level after operations are completed and allowing operators to cope instantly with dosage problems; avoiding the dangers of making fresh concrete with sludge water having excessive or insufficient retarder levels; and making concrete with deactivated concrete. Thus, the present invention provides numerous benefits and avoids the dangers and disadvantages of prior art practices.

The invention claimed is:

1. A method of controlling a concrete sludge water, comprising:
(A) washing concrete containing aggregates from a mixing vessel into an aggregate separator using sludge water from a first sludge tank;
(B) removing said aggregates from said concrete and recovering, in said first sludge tank, wash water from said aggregate-separated concrete;
(C) adding retarder from a retarder tank into said recovered wash water in said first sludge tank, and repeating steps (A) and (B) to increase the concentration of said wash water;
(D) transferring the wash water from said first sludge tank into a second sludge tank having a stirrer operative to prevent settling of the wash water therein, and further having a sensor for detecting the volume of the sludge water in said second sludge tank and a concentration sensor for detecting the concentration of the sludge water in said second sludge tank;
(E) adding retarder from said retarder tank into said second sludge tank;
(F) providing a sensor in said retarder tank operative to send signals to a control center such that the volume of retarder used in said first and second sludge tanks and the volume of the retarder used after completion of daily wash-out operations can be determined; and (G) sending signals from said sensors to said control center whereby the volume of retarder used in said sludge tanks and the volume of retarder used is determined using said control center.

2. The method of claim 1 wherein said sensor to detect the amount of said retarder in said retarder tank is an ultrasonic level sensor.

3. The method of claim 1 wherein said sensor is communicative with said control center using a telephone network, a portable telephone internet network, or an intranet network.

4. The method of claim 1 wherein said sensor operative to transmit a signal corresponding with solids content of sludge water in said second sludge tank to said control center is a concentration sensor.

5. The method of claim 1 wherein said sensor operative to transmit a signal to a control center corresponding to the level of retarder in said a retarder tank is an ultrasonic level sensor and said sensor operative to transmit a signal to the control center corresponding to the solids content in said sludge tank is a concentration sensor.

6. The method of claim 1 comprising detecting the amount of retarder in the sludge water by adding a reducing sugar to the retarder to visually recognize the activity of the concrete in the sludge water by the color reaction with said reducing sugar.

7. The method of claim 6 comprising detecting the amount of retarder in the sludge water by moistening with the sludge water a test paper obtained by allowing a filter paper to adsorb a reagent to exhibit a visually recognizable color reaction with a reducing sugar and drying the moistened filter paper.

8. The method claim 7 wherein said reducing sugar is selected from the group consisting of glucose and dextrose; and the reagent is selected from the group consisting of glucose oxidase, peroxidase, and o-toluidine.

9. Concrete sludge water re-use system, comprising:

(A) an aggregate separator for separating aggregates from a concrete washed from a concrete mixing vessel, and a first sludge tank for depositing aggregate-separated wash water from said mixing vessel;

(B) a retarder tank for dosing said wash water deposited in said first sludge tank;

(C) a second sludge tank having a stirrer operative to prevent settling of the wash water therein, and further having a sensor for detecting the volume of the sludge water in said second sludge tank and a concentration sensor for detecting the concentration of the sludge water in said second sludge tank;

(D) said sensors being communicative with a control center operative to receive signals from said sensors corresponding to the volume of sludge water in said second sludge tank and to receive signals from said concentration sensor corresponding to the concentration of the sludge water in said second sludge tank;

(E) said retarder tank having a sensor operative to send signals to said control center corresponding to the volume of retarder used in said first and second sludge tanks and to the volume of the retarder used after completion of daily wash-out operations.

10. The system of claim 9 wherein said control center is located off premises.

11. The method of claim 1 further comprising performing said steps (A) through (H) using an aggregate separator, retarder tank, sludge tanks, and sensors located at a different premises but sending signals from said sensors located at said different premises to the same control center.

12. The method of claim 1 further comprising opening or closing a valve dispenser on said retarder tank in response to a signal from said control center.

13. The method of claim 1 further comprising collecting data from said sensors using said control center and treating said data statistically to determine whether the amount of retarder added is too great or too little.

* * * * *